April 20, 1937.     A. E. PERKINS     2,078,015
PNEUMATIC TIRE
Filed Dec. 26, 1935     2 Sheets-Sheet 1

Inventor
A. E. Perkins

By Clarence A. O'Brien, and
Hyman Berman   Attorneys

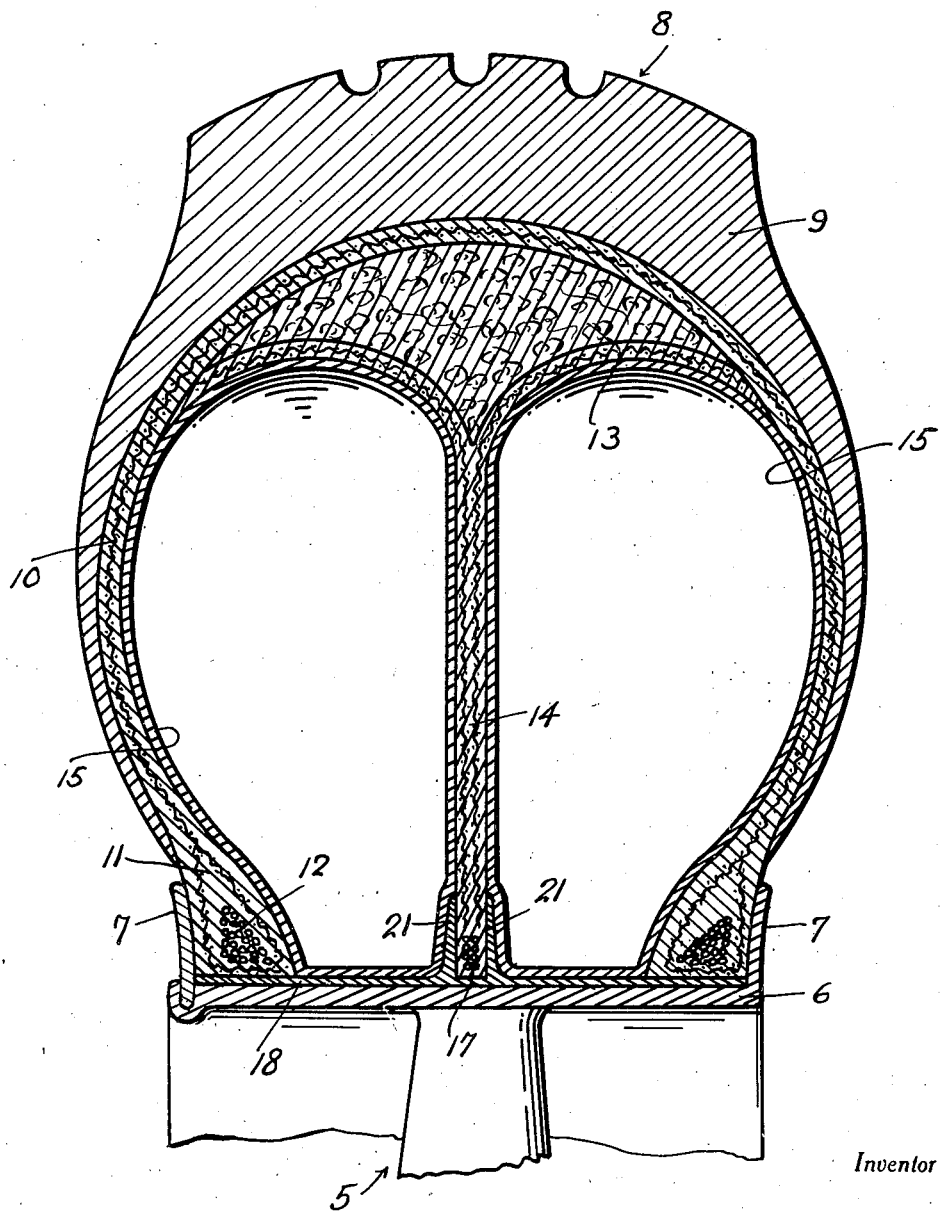

Patented Apr. 20, 1937

2,078,015

UNITED STATES PATENT OFFICE 2,078,015

PNEUMATIC TIRE

Arthur E. Perkins, Fairfield, Idaho

Application December 26, 1935, Serial No. 56,270

3 Claims. (Cl. 152—22)

This invention relates to pneumatic tires for vehicles and particularly to a tire provided with two inner tubes so that upon the deflation of one the other tube will carry the load without the necessity of immediate attention.

An important object of the present invention resides in the provision of a novel inner partition member or a shoe for separating and enclosing the inner tube together with a complemental band or flange particularly adapted to accommodate the partition member so that the partition member will act as an outside cord for the unimpaired tube and keep the latter from spreading to the end that the tube now carrying the load will do so in a manner to positively insure against damage to the tire casing.

A further object of the invention is to provide a pneumatic tire structure and assembly of the character above suggested which will be particularly adapted for use on motor truck wheels.

The invention together with its objects and advantages will be best understood from a study of the following description taken in connection with the accompanying drawings wherein:—

Figure 2 is an enlarged detailed view taken substantially on the line 2—2 of Figure 1.

Figure 1:
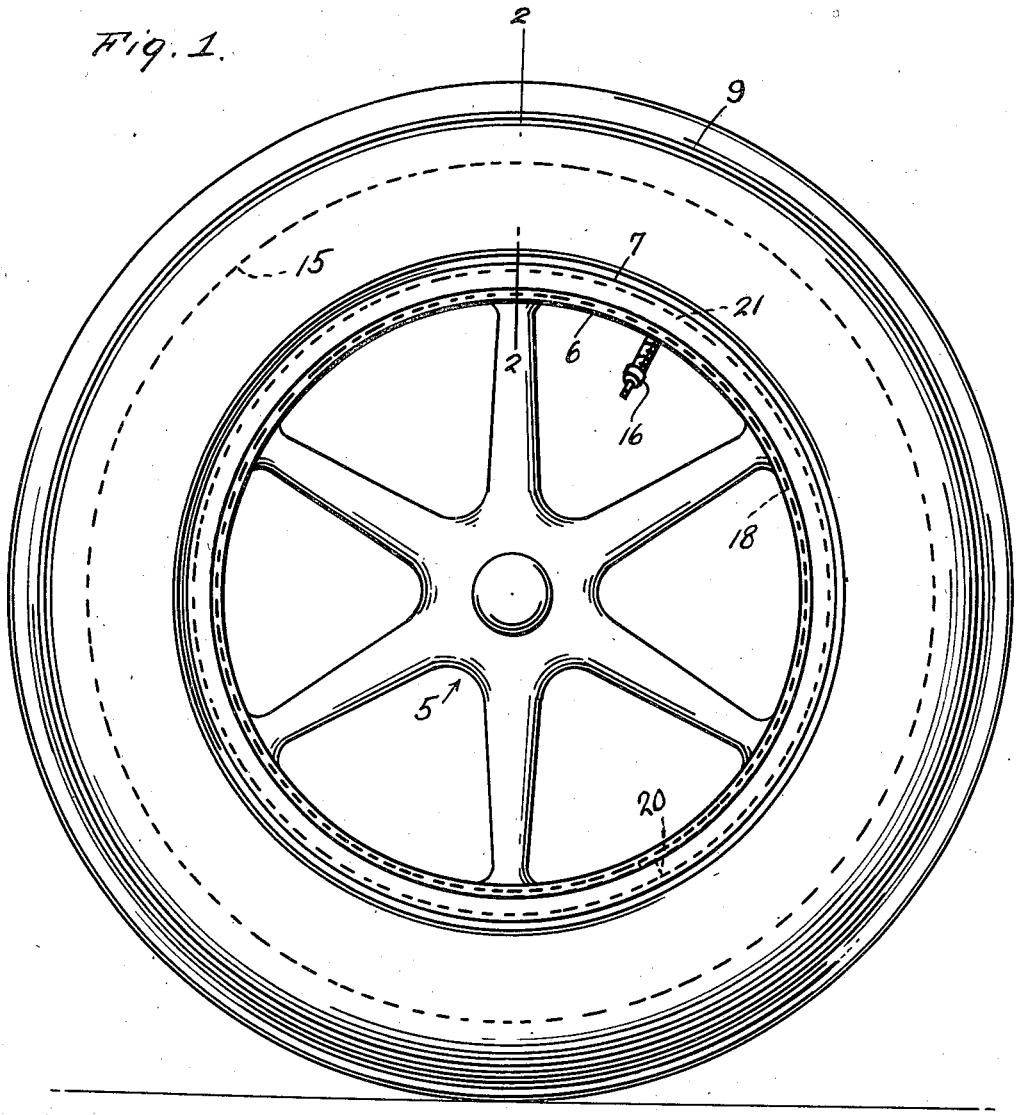
Figure 1 is a side elevational view of a wheel supporting the features of the present invention.

Referring to the drawings by reference numerals it will be seen that the numeral 5 indicates generally a conventional vehicle wheel of the type particularly designed for use in connection with motor trucks. The wheel 5 includes among other parts a channel rim 6 the sides of which are indicated by the reference numeral 7. The reference numeral 8 indicates generally the improved pneumatic tire and the same consists of an outer casing 9 of rubber or other suitable material provided with an inner lining 10 of cord or other suitable fabric having formed integral therewith beads 11 which are accommodated within the channel of the rim 6 as clearly shown and are reinforced as at 12 through the medium of wire strands or the like.

Further the tire assembly includes a shoe 13 of rubber, preferably, and having preferably the cross-sectional shape clearly shown in Figure 2. Integral with the shoe 13 is a partition 14 which serves to divide the casing into a pair of compartments each of which accommodate an inner tube 15 provided with an inflating valve 16. In this connection it will be understood that the rim 6 is suitably apertured to accommodate the inflating valves 16 of the inner tubes 15.

Referring again to the partition member 14, it will be seen, as clearly shown in Figure 2 that at its free edge the said partition member 13 is reinforced by wire strands or the like as is indicated generally at 17.

Figure 3:
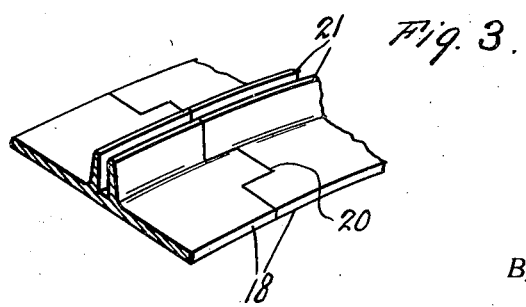
Figure 3 is a perspective view showing the joined ends of the auxiliary flange or band.

Further in accordance with the present invention there is provided a split auxiliary flange or band 18 of steel or aluminum, and at the ends formed by the split the band 18 as clearly shown in Figure 3 is notched to provide on one end of the band a tongue 19 fitting in a recess or notch 20 in the meeting end of the band.

Also at opposite sides of its circumferential center the band 18 is provided with upstanding flanges 21 which form a center channel that receives the free edge of the partition member 14 as clearly shown in Figure 2.

The channel formed by the flanges 21 will serve to retain the partition member 14 in position to prevent undue spreading of the inner tube 15 carrying the load when the other of the inner tubes 15 becomes deflated because of a puncture or for any other reason.

Also as clearly shown in Figure 2 the band 18 fits snugly within the rim 6 between the side flanges 7 of the rim and forms a seat for the beads 11 of the tire casing and also for the inner tubes 15 and will aid in effectively preventing pinching of the inner tubes.

A pneumatic tire assembly of the character herein illustrated and described will be found especially effective for use on motor truck wheels.

Referring again to the member 13 it will be understood that the same is permanently secured within the tire casing in any suitable manner and is formed of sponge rubber.

The lining 10 as well as the partition member 14 is formed of "cord" or analogous fabric. With reference to the member 14 it will be noted that at its inner circular edge the same is split and the portions thereof formed by the split are positively united in any suitable manner with the arcuate inner circumferential faces of the integral shoe 13.

Having thus described the invention what is claimed is:—

1. In a pneumatic tire, an outer casing having a tread wall and side walls terminating with annular beads, two inner tubes arranged side by side in said casing, a thin flexible medial wall extending inwardly from said tread wall between said tubes, a split band arranged within the confines of said outer casing and against which said annular beads bear and said band being provided with a medial channel extending radially outwardly therefrom, and said medial wall having a free circular edge fitting snugly within said channel.

2. In a vehicle wheel, in combination, a vehicle wheel rim channel shaped in cross-section, an outer tire casing having a tread wall and side walls, said side walls terminating in annular beads arranged within the channel of said rim, a split band arranged within the channel of said rim, having a part thereof disposed between said annular beads, two inner tubes arranged side by side in said casing, said band having a medial channel extending inwardly of the tire casing between said inner tubes, and a thin flexible medial wall extending inwardly from the tread wall of said casing between said tubes and having a reinforced free edge fitting snugly within said band channel.

3. In a pneumatic tire, in combination, a wheel rim channel shaped in cross-section, an outer tire casing, two inner tubes arranged side by side in said casing, a removable shoe for said tube in said casing, said shoe comprising a thin annular partition wall having a free reinforced circular edge, a split band arranged within the channel of said rim and provided with a medial channel, and the free reinforced circular edge of said partition wall fitting snugly within the channel of said band.

ARTHUR E. PERKINS.